United States Patent
Borgyos et al.

(10) Patent No.: US 12,211,389 B2
(45) Date of Patent: Jan. 28, 2025

(54) APPARATUS, SYSTEMS, AND METHOD OF PROVIDING AN UNMANNED AND MANNED AIR TRAFFIC MANAGEMENT MASTER SERVICES ARCHITECTURE

(71) Applicant: GE Aviation Systems LLC, Grand Rapids, MI (US)

(72) Inventors: Szabolcs Borgyos, Grand Rapids, MI (US); Vineet Mehta, Grand Rapids, MI (US); Kenneth Stewart, Somerville, MA (US)

(73) Assignee: GE Aviation Systems LLC, Grand Rapids, MI (US)

( * ) Notice: Subject to any disclaimer, the term of this patent is extended or adjusted under 35 U.S.C. 154(b) by 205 days.

(21) Appl. No.: 17/781,260

(22) PCT Filed: Dec. 4, 2020

(86) PCT No.: PCT/US2020/063268
§ 371 (c)(1),
(2) Date: May 31, 2022

(87) PCT Pub. No.: WO2021/194568
PCT Pub. Date: Sep. 30, 2021

(65) Prior Publication Data
US 2022/0415190 A1   Dec. 29, 2022

Related U.S. Application Data

(60) Provisional application No. 62/943,673, filed on Dec. 4, 2019.

(51) Int. Cl.
*G08G 5/00* (2006.01)
*H04L 67/125* (2022.01)

(52) U.S. Cl.
CPC ........ *G08G 5/0043* (2013.01); *G08G 5/0069* (2013.01); *H04L 67/125* (2013.01)

(58) Field of Classification Search
CPC .. G08G 5/0043; G08G 5/0069; G08G 5/0026; G08G 5/0013; H04L 67/125
(Continued)

(56) References Cited

U.S. PATENT DOCUMENTS

2017/0148332 A1\* 5/2017 Ziemba .................. H04B 1/713
2018/0111683 A1  4/2018 Di Benedetto et al.
(Continued)

FOREIGN PATENT DOCUMENTS

| EP | 3158553 A1 | 4/2017 |
|---|---|---|
| WO | 2016154948 A1 | 10/2016 |
| WO | 2019093197 A1 | 5/2019 |

OTHER PUBLICATIONS

International Search Report & Written Opinion dated Nov. 16, 2021 pertaining to PCT Application No. PCT/US2020/063268 filed Dec. 4, 2020, pp. 1-14.

*Primary Examiner* — Tyler D Paige
(74) *Attorney, Agent, or Firm* — Dinsmore & Shohl LLP

(57) ABSTRACT

Systems and methods provide a services architecture. An air mobility platform locally stores a native application at. The air mobility platform receives a first request for a first service and data identifying the first user as a priority user type or a non-priority user type. A second request for a second service and data related to the second user identifies the user type is received. The air mobility platform calculates a priority for the first request. If the priority for the first request exceeds the priority for the second request, a third party application is accessed for the first request. The air mobility platform submits the data related to the first request
(Continued)

from the third party application to at least one of the first unmanned aerial vehicle or the first user.

16 Claims, 10 Drawing Sheets

(58) Field of Classification Search
USPC .......................................................... 701/120
See application file for complete search history.

(56) References Cited

U.S. PATENT DOCUMENTS

| | | | |
|---|---|---|---|
| 2018/0247544 A1* | 8/2018 | Mustafic | H04W 48/08 |
| 2019/0088145 A1* | 3/2019 | Chambers | G08G 5/0086 |
| 2020/0334992 A1 | 10/2020 | Yamada et al. | |
| 2020/0349852 A1* | 11/2020 | DiCosola | B64C 39/024 |

* cited by examiner

APPARATUS, SYSTEMS, AND METHOD OF PROVIDING AN UNMANNED AND MANNED AIR TRAFFIC MANAGEMENT MASTER SERVICES ARCHITECTURE

CROSS-REFERENCE TO RELATED APPLICATIONS

This application is a National Stage Entry under 35 U.S.C. § 371 of International Patent Application No. PCT/US2020/063268, filed Dec. 4, 2020, which claims priority to U.S. Provisional Application No. 62/943,673 entitled "APPARATUS, SYSTEM, AND METHOD OF PROVIDING AN UNMANNED & MANNED AIR TRAFFIC MANAGEMENT MASTER SERVICES ARCHITECTURE," filed on Dec. 4, 2019, which is incorporated herein by reference in its entirety.

TECHNICAL FIELD

This disclosure relates generally to aircraft services, and, more particularly, to an apparatus, system, and method of providing a services architecture for unmanned aerial vehicles.

BACKGROUND

Few technologies today command as much interest and excitement as aerial vehicles, such as unmanned aerial vehicles. While current implementations have included governmental uses, it has been proposed that unmanned aerial vehicles be further expanded into commercial services, such as safety and security, product delivery, real estate and surveys, and so on.

While the growth in applications for aerial vehicles presents economic opportunity, it also presents significant challenges, such as to first responders, safety and security personnel, and to other aerial vehicles that may be monitored by regulatory authorities such as the Federal Aviation Administration (FAA). There is no system in place presently to manage airspace for unmanned aerial vehicles. Similarly, there is no autonomous mechanism to provide an approval process for unmanned aerial vehicle missions, and thus such flights often occur without proper approvals or with incomplete mission plans. Because of this, there may be detrimental impact on aerial vehicles that have approved flight plans, and on first responder or other emergency services activity, stemming from unmanaged, improper, and/or unnecessarily dangerous operation of an unmanned aerial vehicle.

For use of U.S. airspace, the FAA has a registration process (as do some local authorities and agencies), although the approval process typically takes 24 hours or more. For at least this reason, many operators of unmanned aerial vehicles fail to pursue flight plan approvals. Because it is difficult to distinguish an unauthorized unmanned aerial vehicle from an authorized aerial vehicle in a restricted airspace in real time, it is also difficult to punish owners or operators of the unauthorized aerial vehicle. Thus, a need for providing a services architecture for unmanned aerial vehicles exists in the industry.

SUMMARY

Described herein is a computer-implemented system for providing a master services architecture for providing a requested service to an unmanned aerial vehicle, comprising: an air mobility platform comprising a computing device that includes a processor and a memory component that stores logic that, when executed by the processor, causes the air mobility platform to perform at least the following: store a native application locally at the air mobility platform; receive a first request for a first service, data related to a first user associated with the first request, and data identifying a first unmanned aerial vehicle, wherein the data related to the first user identifies the first user as at least one of a priority user type or a non-priority user type; receive a second request for a second service, data related to a second user associated with the second request, and data identifying a second unmanned aerial vehicle, wherein the data related to the second user identifies the second user as at least one of the priority user type or the non-priority user type; calculate, using a weighted model, a priority for the first request based on at least one of the first service, data related to the second user, or the data identifying the second unmanned aerial vehicle; determine whether the priority for the first request exceeds a priority for the second request; in response to determining the priority for the first request exceeds the priority for the second request, tunnel access to a third party application to receive data related to the first request from the third party application prior to processing the second request, wherein the third party application resides on a remote computing device; and submit the data related to the first request from the third party application to at least one of the first unmanned aerial vehicle or the first user.

Further described is a method for processing a requested service for an unmanned aerial vehicle, comprising: storing, by an air mobility platform, a native application locally at the air mobility platform; receiving, by the air mobility platform executing the native application, a first request for a first service, data related to a first user associated with the first request, and data identifying a first unmanned aerial vehicle, wherein the data related to the first user identifies the first user as at least one of a priority user type or a non-priority user type; receiving, by the air mobility platform executing the native application, a second request for a second service, data related to a second user associated with the second request, and data identifying a second unmanned aerial vehicle, wherein the data related to the second user identifies the second user as at least one of the priority user type or the non-priority user type; calculating, using a weighted model by the air mobility platform executing the native application, a priority for the first request based on at least one of the first service, data related to the second user, or the data identifying the second unmanned aerial vehicle; determining, by the air mobility platform executing the native application, whether the priority for the first request exceeds a priority for the second request; in response to determining the priority for the first request exceeds the priority for the second request, tunneling, by the air mobility platform executing the native application, access to a third party application to receive data related to the first request from the third party application prior to processing the second request, wherein the third party application resides on a remote computing device; and submitting, by the air mobility platform executing the native application, the data related to the first request from the third party application to at least one of the first unmanned aerial vehicle or the first user.

Also described is a non-transitory computer-readable medium that stores logic that, when executed by a computing device, causes the computing device to perform at least the following: store a native application locally; receive a first request for a first service, data related to a first user associated with the first request, and data identifying a first unmanned aerial vehicle, wherein the data related to the first user identifies the first user as at least one of a priority user type or a non-priority user type; receive a second request for a second service, data related to a second user associated with the second request, and data identifying a second unmanned aerial vehicle, wherein the data related to the second user identifies the second user as at least one of the priority user type or the non-priority user type; calculate, using a weighted model, a priority for the first request based on at least one of the first service, data related to the second user, or the data identifying the second unmanned aerial vehicle; determine whether the priority for the first request exceeds a priority for the second request; in response to determining the priority for the first request exceeds the priority for the second request, tunnel access to a third party application to receive data related to the first request from the third party application prior to processing the second request, wherein the third party application resides on a remote computing device; and submit the data related to the first request from the third party application to at least one of the first unmanned aerial vehicle or the first user.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Embodiments disclosed herein include systems and methods for providing a master services architecture for providing requested services to an unmanned aerial vehicle. Disclosed embodiments may include an air mobility platform comprising a plurality of applications. In an example, each of the plurality of applications provides at least one of services or data regarding the requested services. The requested services comprises services or data specific to the unmanned aerial vehicle. In embodiments, the air mobility platform may identify one of the plurality of applications to service the request, access the identified application responsive to the request, and, based on a profile of the unmanned aerial vehicle or user related to the request, initiate communication of responsive information to a device associated with the request. The user may be provided with a user interface capable of receiving a request for the requested services, initiating communication of the request to the air mobility platform, and receiving responsive information responsive to the request from the air mobility platform.

Embodiments described herein utilize a single user interface across a plurality of applications and modules integrated with the services architecture. This provides a user with a more cohesive flight planning and monitoring experience. These embodiments may reduce code duplication and back-end processing by providing tunnel access to third party data for services and applications registered to the services architecture. Embodiments may also provide a gateway that limits any cross data flow as between applications or modules, except in circumstances where a user is also an authorized user of each of those independent applications. Some embodiments may reduce the need for independent access to each of a large number of separate applications in order to generate a flight plan and/or to perform flight monitoring.

Figure 1:
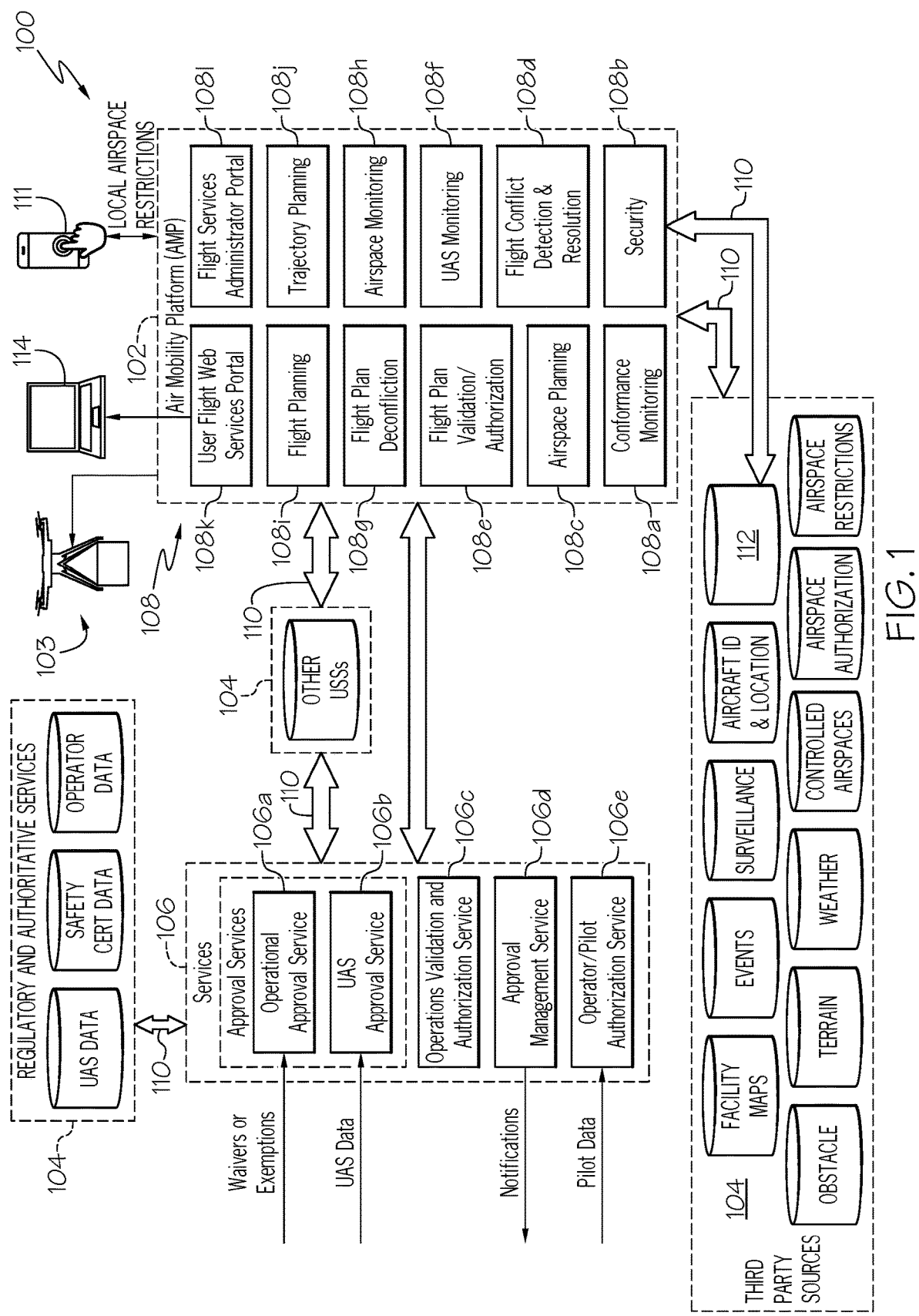
FIG. 1 depicts an architecture for providing traffic management for an aerial vehicle, according to embodiments provided herein.

Referring now to the drawings, FIG. 1 depicts an architecture 100 for providing traffic management services for a vehicle, according to embodiments provided herein. As illustrated, the architecture 100 provides an air mobility platform 102 that is communicative with third party data sources 104 to autonomously provide an operational approval service 106a, an aerial vehicle approval service 106b, an operations validation and authorization service 106c, an approval management service 106d, and an operator/pilot authorization service 106e (collectively "UA-centric services 106"). The air mobility platform 102 may be provided by one or more computing devices, such as those depicted in FIG. 14. The third party data sources 104 may be rules-based, non-rules based, informationally based, etc. As an example, some embodiments may provide multilayer services for an unmanned aerial vehicle 103, manned aerial vehicle, equipment, weather, ground control, and/or operational services.

The air mobility platform 102 may include one or more applications, such as a conformance monitoring application 108a, a security application 108b, an airspace planning application 108c, a conflict detection and resolution application 108d, a flight plan validation/authorization application 108e, an aerial vehicle monitoring application 108f, a flight plan deconfliction application 108g, an airspace monitoring application 108h, a flight planning application 108i, a trajectory planning application 108j, a user flight web services portal application 108k, and a flight services administrator portal application 108l (collectively referred to as "applications 108"). In embodiments, the applications 108 may each comprise logic that interact or communicate with one or more of a plurality of third party data sources 104, such as to obtain rules or as the result of externally applied rules, to obtain public or privately available information, and/or obtain data models or approval models provided by authoritative bodies and/or other third parties, such as the FAA or the National Weather Service or the US Geological Survey.

In embodiments, the applications 108 may communicate with each other. Moreover, while identified as different applications 108 at least for purposes of explanation, it is noted that the applications 108 may be combined or subdivided in any appropriate manner. As illustrated, the applications may include a conformance monitoring application 108*a* which may monitor conformance of an aerial vehicle 103 with flight plans. In another aspect, the applications may include a security application 108*b* which may provide system security and diagnostics functions. For instance, security application 108*b* may ensure security during flight of an aerial vehicle 103. According to embodiments, the applications 108 may include an airspace planning application 108*c* which may provide rules and parameters for an airspace. Additionally or alternatively, the applications 108 may include a conflict detection and resolution application 108*d* that may determine conflicts proposed flight plans and non-native data, such as information from third party data sources 104 as described herein. It is further noted that conflict detection and resolution application 102*d* may be utilized, such as by flight planning application 108*i* to determine candidate trajectories.

A flight plan validation/authorization application 108*e* may determine whether a flight plan is feasible, validate flight plans via conflict detection and resolution application 108*d*, or other applications. A UAS monitoring application 102*f* may assist in monitoring at least one aerial vehicle 103 to determine requests, operating parameters, or the like. A flight plan deconfliction application 108*g* may identify and resolve conflicts (e.g., deconflict) between flight plans and proposed flight plans and generate resolutions by modifying trajectories. In some embodiments, flight planning application 108*i* may utilize flight plan deconfliction application 108*g* to identify candidate flight plans. It is further noted that flight plan validation/authorization application 108*e* may utilize deconfliction application 108*g* and/or conflict detection and resolution application 108*d* to verify, authorize, or reject flight plans. An airspace monitoring application 108*h* may monitor airspaces for changes, conflicts, or the like. In an aspect, the airspace monitoring application 108*h* may communicate with aerial vehicles 103, third party data sources 104, and other information to provide real-time or near real-time monitoring of an airspace. According to various embodiments, this monitoring may be utilized to authorize, reject, modify, or otherwise process flight plans that may be subject to a request or may have already been granted or denied.

As described here and elsewhere, the flight planning application 108*i* may communicate with various other applications and data sources, such as a trajectory planning application 108*j*, to identify an optimized trajectory or otherwise deny a flight plan. Is if further noted that the referenced applications 108 may communicate with a user, such as via a user flight web services portal application 108*k*, or a flight services administrator portal application 108*l*. As described herein, user interfaces may be provided specific to the user flight web services portal application 108*k*, the flight services administrator portal application 108*l*, or others.

The UA-centric services 106 may provide an operating system for native or external engines, modules, and applications, such as the applications 108. The applications 108 may each include modules or applications that draw on the third party data sources 104. The third party data sources 104 may include aerial vehicle data, safety certification data, operator data, other UAS service suppliers (USS) data, facility maps data, events, surveillance data, aerial vehicle identification and location data, obstacle data, terrain data, weather data, controlled airspaces data, airspace authorization data, airspace restrictions data, and/or other third party data sources 112.

The third party data sources 104 may include rules, the result of externally applied rules, public or privately available information, data models, approval models such as may be provided in relation to aerial vehicle registration, operator registrations, relevant identity certifications of aerial vehicle and/or operators, flight plan submissions, mission requests, capabilities verifications, testing data, simulation data, etc. As such, the third party data sources 104 may extend beyond typical aerial vehicle aspects, including but not limited to authoritative data provided by other rulemaking or governmental bodies, such as the FCC in relation to radiofrequency operation within FCC bandwidth guidelines, or the National Weather Service, etc.

The air mobility platform 102 may also provide interaction with the applications 108 over any of a plurality of communication sockets 110 that may apply security features and a user interface 114 (one or more). The air mobility platform 102 may provide the UA-centric services 106 and such as may include the planning, approval, and modification of airspace rules (such as exclusionary management for first responders/no fly zones as they arise, and the like), aerial vehicle or user profiles, submitted mission requests, conformance with flight plans, confliction of flight plans, conflict resolution, etc. This data may be communicated between the air mobility platform 102 over a multi-level bus 330, such as for display on the user interface 114.

The air mobility platform 102 may interact with the third party data sources 104, such as but not limited to authoritative, governmental, historical, simulation, and weather-related sources. For example, third party aerial vehicle and ground-based surveillance may be monitored and data obtained therefrom. Obstacle detection sites, such as terrain, geographical and structural assessment may be accessed. Weather forecasting may be accessed for any area relevant to the mission requested. Aerial vehicle use, capability, health, and performance data may be assessed. Current airspace activity by other aerial vehicle, no fly zones, and the like may also be monitored.

That is, the architecture 100 may enable and control the communication sockets 110 to the third party data sources 104, and may select therefrom relevant data unique to each request for the UA-centric services 106 for use by the decision-making aspects of architecture 100. Thereby, the UA-centric services 106 may be provided in real time, even in the event of submission of a large number of service requests in a variety of different geographies and air spaces substantially simultaneously, and/or where each service utilizes a distinct assessment and manipulation of data unique to each such geography, airspace, or operator.

Figure 2:
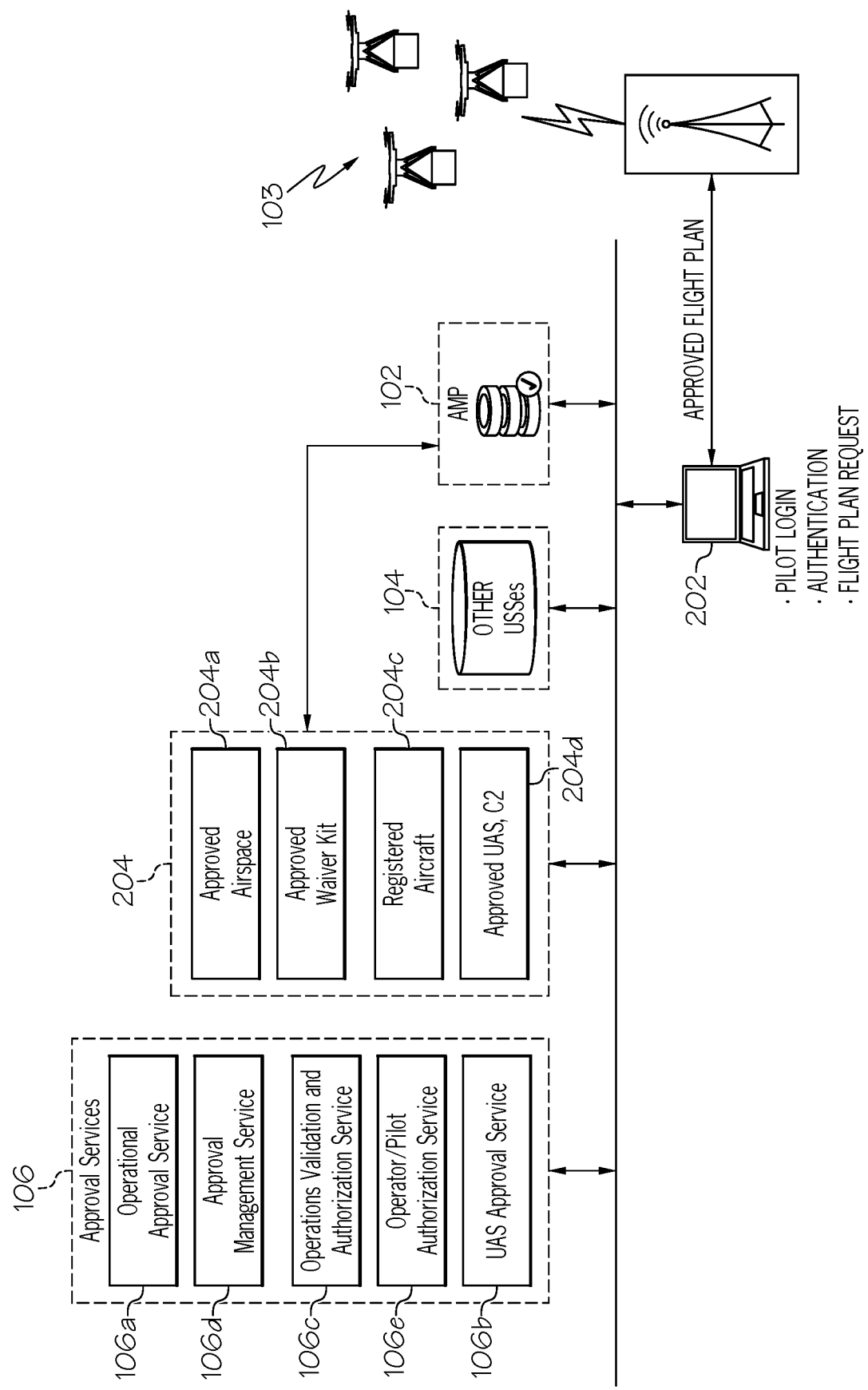
FIG. 2 depicts a computing environment for utilizing the air mobility platform to provide providing traffic management for an aerial vehicle, according to embodiments provided herein.

FIG. 2 depicts a computing environment for utilizing the air mobility platform 102 to provide traffic management services for an aerial vehicle 103 (which may be configured as an unmanned aerial vehicle), according to embodiments provided herein. As illustrated, a user of a user computing device 202 may access a user interface 114 (FIG. 1) provided by the air mobility platform 102 to make a service request for one or more of the UA-centric services 106 and/or service data 204 for the aerial vehicle 103. As illustrated, the UA-centric services 106 of this embodiment may an operational approval service 106a, an approval management service 106d, an operations validation and authorization service 106c, an operator/pilot authorization service 106e, and an aerial vehicle approval service 106b. The service data 204 in this embodiment may include approved airspace data 204a, an approved waiver kit 204b, registered aerial vehicle data 204c, and approved UAS data 204d. Similarly, third party data sources 104 (FIG. 1) may make a service request for a third party vehicle.

Depending on the particular embodiment, the service request may include approved airspace reservation, conflict identification, conflict resolution, etc. Upon receiving approval, the user computing device 202 (which may or may not be the same computing device that requested the service) may control the aerial vehicle 103 according to the UA-centric services 106 that was requested.

Figure 3:
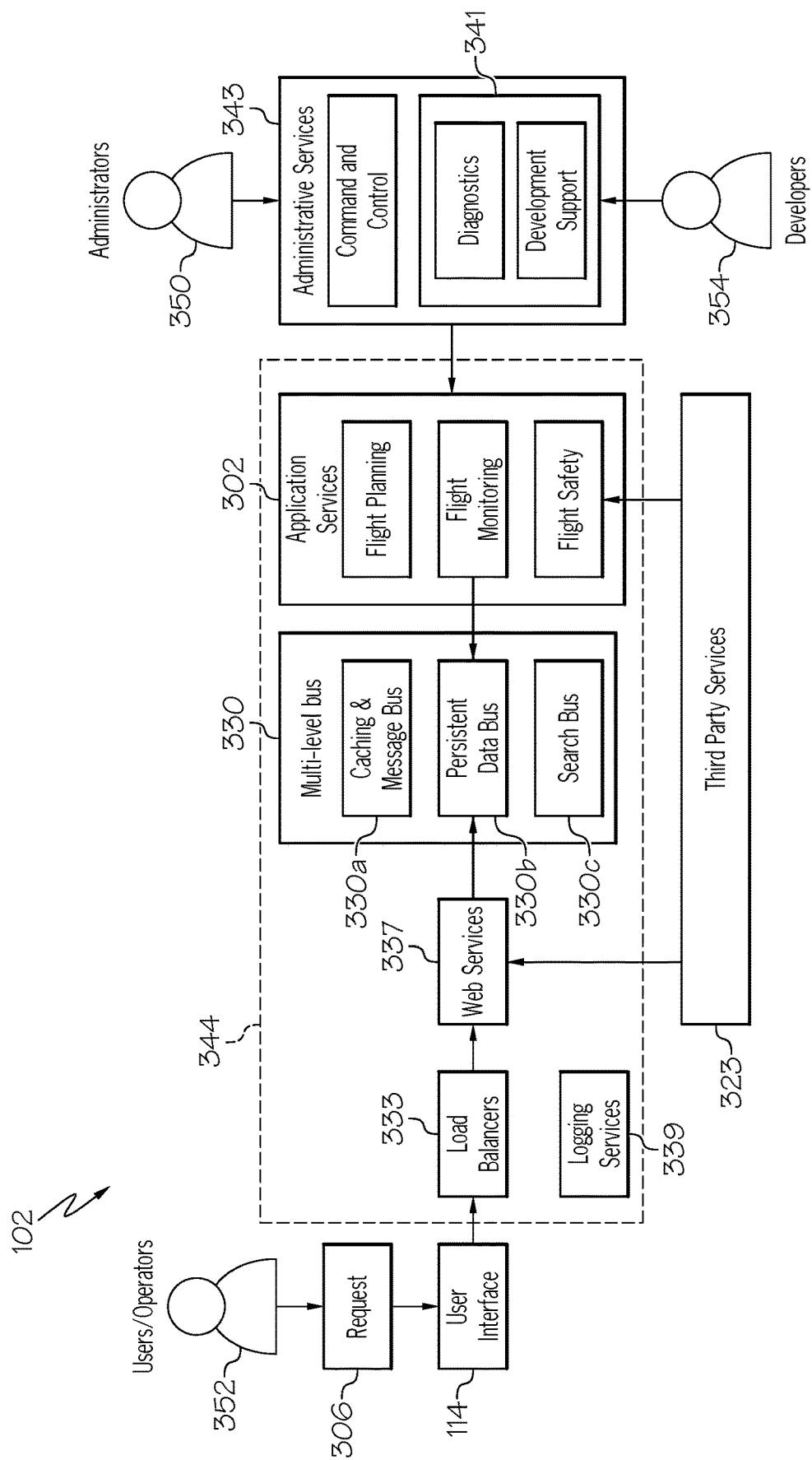
FIG. 3 depicts a services architecture for providing traffic management for an aerial vehicle, according to embodiments provided herein.

FIG. 3 depicts a services architecture 300 for providing surveillance services for an aerial vehicle 103, according to embodiments provided herein. As illustrated, the services architecture 300 may be part of the air mobility platform 102 (FIG. 1) and may provide access to applications 108 that provide a service for the request 306. As described with reference to FIG. 1, the applications 108 may include a flight planning application 108i, a flight monitoring application, a flight safety application, and/or other applications. The services architecture 300 may provide administrative and/or user access to presentations of the applications 108, through the user interface 114.

As is further illustrated in FIG. 3, the services architecture 300 may provide operating-system level control over a variety of aspects in execution of the multi-level bus 330. The multi-level bus 330 may include a caching and message bus 330a, a persistent data bus 330b, and a search bus 330c. Additionally, the services architecture 300 may use the applications 108 to perform a service for the request 306 (which may be requested or automatically provided as part of a request). The services architecture 300 may further include load balancers 333, a web services module 337, a logging services module 339, etc.

The caching and message bus 330a may comprise logic for in-memory object caching or data grid. In the data grid, data may evenly be distributed among nodes of a cluster to provide horizontal scaling, which may provide for increased load capabilities and increase processing speed. For example, the logic of caching and message bus 330a may provide for distributed object caching and locking, and node-to-node messaging in a HAZELCAST architecture.

The persistent data bus 330b may store characteristic of states of processes or files. In an example, the persistent data bus 330b may persist (e.g., archive or store the state of data from) one or more databases. For instance, the persistent data bus 330b may persist data from third party data sources 104, including but not limited to data bases comprising information related to facility maps, events, surveillance, aerial vehicle ID and location data, obstacles, terrain, weather, controlled airspaces, airspace authorizations, mobile messages, and airspace restrictions. In examples, the services architecture 300 may comprise multiple instances of the persistent data bus 330b to provide security, load management, or the like. It is noted that the persistent data bus 330b may include logic that may transfer data to and from data stores and may provide mappings from the native programming-language data structures to data store storage structures.

The search bus 330c may comprise search and analytics logic. In examples, the search and analytics logic may comprise APIs, query DSLs, and clients that support a variety of programming languages, such that the search bus 330c may perform searches over different third party data stores or systems. For instance, services architecture 300 may provide dynamic user interfaces to users based on a user's credentials, classification, or particular needs. The search bus 330c may search for data from one or more data sources such that user interfaces 114 may receive and display different pieces of data from different data stores. In an aspect, the search bus 330c may process request 306 and perform a query on one or more third party data sources 104 via third party services 323 (which may include a logic that provides access to third party data sources 104). It is noted that the search bus 330c may utilize a hash map, ELASTICSEARCH, SQLite, or the like.

According to embodiments, the multi-level bus 330 may direct applications to communicate with each other, such as with others on the same bus level, wherein those communications are arbitrated without the need of a host computer. For instance, the multi-level bus 330 may provide oversight and bus level assignments, on behalf of the services architecture 300. In an example, the multi-level bus 330 may control access to one or more of the levels and may coordinate the activities of all applications and requests by taking into account the needs of various applications and requests. In at least one embodiment, the multi-level bus 330 may control priority for gaining access to resources according to a predetermined priority. For instance, a priority system may provide priority to first responders for certain applications, may provide priority to requests 306 associated with specific users, may provide priority to requests 306 for particular mission-critical or safety applications, and the like. Further, the services architecture 300 may include control, monitoring, security and switching capability for a variety of communication inputs, outputs, and links provided by and communicative with the aspects throughout the master services system.

In embodiments, the air mobility platform 102 may calculate priorities for requests by applying a weighted model. The weighted model may weigh or balance various relationally applied factors, where weighting and balancing may vary in accordance with machine learning over time. For example, factors may be applied to determine priority, wherein certain factors are weighted more heavily than other factors in a given services request. The factors may include a request, data related to a user associated with a request, data identifying an unmanned aerial vehicle, or information received from third party data sources 104. Embodiments may utilize different or other factors according to a weighted model.

The request may identify one or more services to receive from the applications 108. In some embodiments, a type of a request or application to which the request is made may be utilized by the air mobility platform 102 to calculate priorities based on a weighted model. As an example, requests for security services and emergency flights may be weighted more heavily as a priority than a request for a commercial flight.

The data related to the user may identify a type of the user, such as a priority user type or a non-priority user type. In embodiments, the air mobility platform 102 may assign user types based on user credentials, administrator settings, vehicle type, organizational affiliation, or the like. The priority user type may include first responder user types, military user types, regulatory body user types, administrative user types, etc. Examples of non-priority user types include recreational user types, commercial user types, etc. The data identifying the unmanned aerial vehicle may include aerial vehicle identification numbers (e.g., tail numbers, etc.), aerial vehicle type (e.g., weather drone, emergency aerial vehicle, etc.), capabilities, health or safety information of an aerial vehicle, performance data, etc. Data from third party sources 104 may include whether patterns, location of an incident (e.g., accident, emergency, etc.), etc.

In an example, a priority user may submit a request to the air mobility platform 102 for a first request and a non-priority user may submit a second request to the air mobility platform 102. According to one embodiment, the air mobility platform 102 may utilize the weighted model to determine the priority of the first request and the second request. In some examples, the second request from the non-priority user may be given priority over the first request from the priority user, such as when the second request identifies a priority activity, such as a failure condition of an aerial vehicle during flight, or the like. In other examples, the air mobility platform 102 may interpolate a location of a hazard or incident with the first request and the second request to identify whether the first request or the second request relates to the hazard or incident. In response to identifying one of the first request or the second request relates to the hazard or incident, the air mobility platform 102 may apply weights to determine appropriate prioritize.

In some embodiments, the air mobility platform 102 utilizes artificial intelligence, statistical models, or other processes and/or algorithms. For instance, classifiers may be mapped to an attribute vector to a confidence that the attribute belongs to a class. An input attribute vector, x=(x1, x2, x3, x4, xn) may be mapped to f(x)=confidence(class). Such classification can employ a probabilistic and/or statistical based analysis to infer a probability of a priority. The air mobility platform 102 may determine whether to assign a priority based on the probability exceeding a probability threshold (e.g., a percentage, a number of tokens out of possible tokens, etc.). In various embodiments, the air mobility platform 102 may utilize other directed and undirected model classification approaches include, e.g., naïve Bayes, Bayesian networks, decision trees, neural networks, fuzzy logic models, and probabilistic classification models providing different patterns of independence. Classification may also include statistical regression that the air mobility platform 102 may utilize to develop models of priority.

In some embodiments, the air mobility platform 102 may identify an emergency request which may be given absolute priority, regardless of other requests. For example, the air mobility platform 102 may provide requests related to national security with an absolute priority. According to some embodiments, the air mobility platform 102 may determine whether a plurality of requests with absolute priority are received and may process such requests according to rules, order of receiving the requests, or a weighted model for absolute priority requests.

As described herein, the air mobility platform 102 may receive requests 306 from one or more users 352. Load balancers 333 may include logic to manage network loads and may prioritize certain requests related to safety, first responders, or the like. Web services 377 my listen for requests 306 over a network, such as via one or more communication sockets 110 of FIG. 1. It is noted that web services 377 may communicate with mobile applications, servers, or the like. In another aspect, web services 377 may interact with or compile content from third party services 323 in to a single user interface 114. The multi-level bus 330 may process requests 306 and may provide access to one or more applications via the application services 302 based on received request 306 and priority. For instance, the application services 302 may select an appropriate application for performance of the services related to the request 306. The selected application of the application services 302 may perform such services and may provide responses to a UAS, the user interface 314, or other appropriate systems. In at least some embodiments, the communication sockets 110 may include logging services module 339 to log network traffic, user requests, system performance or activity, and the like.

In another aspect, the services architecture 300 may provide inputs and outputs for a variety of data and information, such as to and from a user 350, 352, or 354, as well as to and from the third party sources 323 or services. As such, users may utilize a user device that receives and provides user interface 114 to interact with third party sources 323 via the master services architecture 300.

For instance, the multi-level bus 330 may provide for communications between the user interface 114 and the application services 302. The multi-level bus 330 may, for example, include logic to select the appropriate application services 302 to grant the request 306 for a service, over the multi-level bus 330. It is noted that application services 302 may include applications providing services via the multi-level bus 330 that are not directly related to the request 306. The services architecture 300 may additionally vary in its presentation and deployment to different users, developers, third-parties, and administrative entities In an aspect, the services architecture 300 may include administrative services 343 that may allow an administrative level user 350 or developer level user 354 to perform various functions, such as performing diagnostics, developing applications 108, or commanding and controlling aspects of the services architecture 300.

The services architecture 300 may further provide inputs and outputs for a variety of data and information, such as to and from a user, as well as to and from the third party data sources 104, which may interact with one another and with the applications 108 that include the logic to select which of services for the request 306 are granted, over the multi-level bus 330.

The actions performed may include services provided via the multi-level bus 330 that may or may not be directly related to the request 306. As an example, the provided services may include load balancing via a load balancers 333, web and communication link management via the web services module 337, data logging services via a logging services module 339, development support and diagnostics via a support module 341, and administrative services via a command and administrative services 343.

In an aspect, the services architecture 300 may provide tunnel access to some or all applications 108 (e.g., though application services 302) and third party sources 323 to user interface 114 or services. The services architecture 300 may provide tiered user access (e.g., administrative level user 350, non-administrate or basic user 352, developer level user 354, pilot, first responder or emergency user, or other credential based access) to receive user interface 114 presentations of one or more of the applications 108. The services architecture 300 may additionally vary in its presentation and deployment to different users, developers, third parties, and administrative entities.

Figure 4:
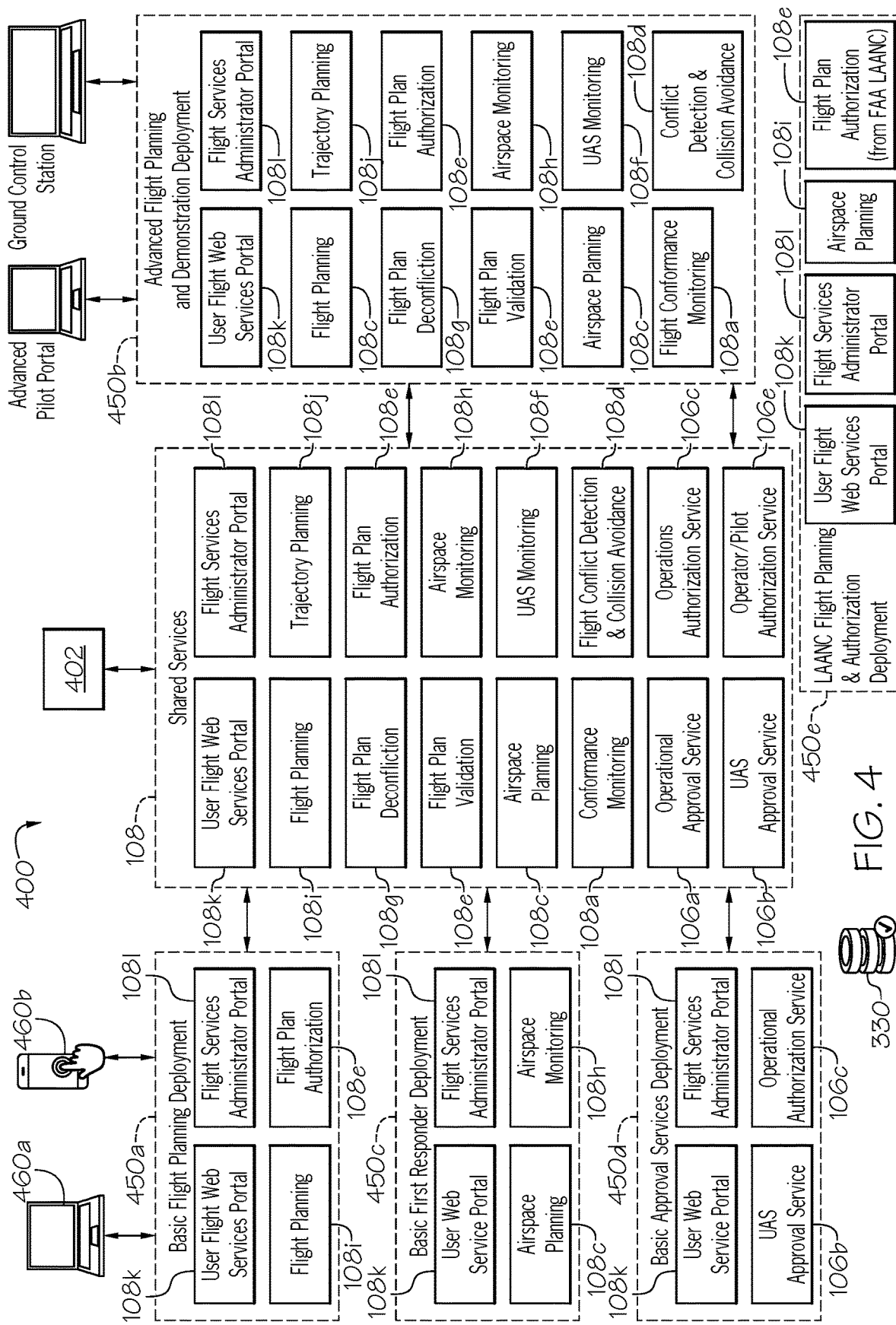
FIG. 4 depicts another services architecture for providing traffic management services showing shared application for one or more different types of applications, according to embodiments provided herein.

FIG. 4 depicts another services architecture 400 for providing surveillance services showing shared application for one or more different types of applications, according to embodiments provided herein. As illustrated, users may receive a deployment of the services architecture 400 to access data and/or the applications 108, such as may relate to a basic functionality level of the multi-level bus 330. In some examples, users may be provide with tunnel access to various applications 108. In addition to the applications 108a-108l provided in FIG. 1, the applications 108 may additionally include the operational approval service 106a, the validation and authorization service 106c, the aerial vehicle approval service 106b, operator/pilot authorization service 106e and/or other UA-centric services 106. The applications 108 and/or UA-centric services 106 that are shared may vary, such as based on a request from a pilot portal computing device 460a and/or based on the permissions available for that user's login profile. This data and/or the applications 108 that are provided to this user may also be dependent upon the offerings provided by a basic flight planning deployment infrastructure 450a with which the pilot portal computing device 460a, the pilot application 460b, and/or other pilot controlled devices communicate. In at least one embodiment, applications 108 may interact with third party or non-native applications 402. This variability in the deployment of the services architecture 400 may be sensed and controlled by the services architecture 400 itself, such as using sensed values by the applications 108 over the multi-level bus 330.

As illustrated in FIG. 4, particular types of users and/or requests may receive access and/or data to and through one or more of the applications 108, such as captive/native applications of the services architecture 400. As an example, a basic flight planning deployment infrastructure 450a may share the user flight web services portal application 108k, the flight services administrator portal application 108l, the flight planning application 108i, and the flight plan validation/authorization application 108e. Similarly, an advanced flight planning and demonstration deployment infrastructure 450b may share the user flight web services portal application 108k, the flight services administrator portal application 108l, the flight planning application 108i, the trajectory planning application 108j, the flight plan deconfliction application 108g, the flight plan validation/authorization application 108e, the airspace monitoring application 108h, the airspace planning application 108c, the aerial vehicle monitoring application 108f, the conformance monitoring application 108a, and the conflict detection and resolution application 108d.

A basic first responder deployment infrastructure 450c may share the user flight web services portal application 108k, the flight services administrator portal application 108l, the airspace planning application 108c, and the airspace monitoring application 108h. A basic approval services deployment infrastructure 450d may share the user flight web services portal application 108k, the flight services administrator portal application 108l, the aerial vehicle approval service 106b, and the operations authorization service 106c.

Similarly, a low altitude authorization and notification capability (LAANC) flight planning and authorization deployment infrastructure 450e may share the user flight web services portal application 108k, the flight services administrator portal application 108l, the flight planning application 108i, and the flight plan validation/authorization application 108e from (FAA LAANC).

It will be understood that the foregoing deployment of the services architecture 400 may utilized a shared set of non-user facing services/applications. For example, such a shared set of services may include load balancing, communication link provisioning, data storage, generation of alerts, input and output control, security, etc. These shared services may be deployed as one or more interface sockets communicatively associated with each of the unique deployments of the services architecture 400 discussed herein.

Accordingly, the embodiments may enable a mission request approval process for an aerial vehicle 103 that is unique to each request, and that is relationally applied, such as from one or more databases of the air mobility platform 102. Further, the air mobility platform 102 may analyze network loads and requests based on weighing and balancing of factors, wherein the weighting and balancing may vary in accordance with machine learning over time. For example, factors may be applied based on priority, wherein certain factors are weighted more heavily than other factors in a given approval request. By way of example, static factors, which may be more simply approved by the disclosed embodiments, may be prioritized in order to expedite processing and improve allocation of computing resources. Thereafter, dynamic factors may be assessed by the disclosed embodiments, but such dynamic factors may be assessed only to the extent necessary, such as may be based on machine learning.

Figure 5:
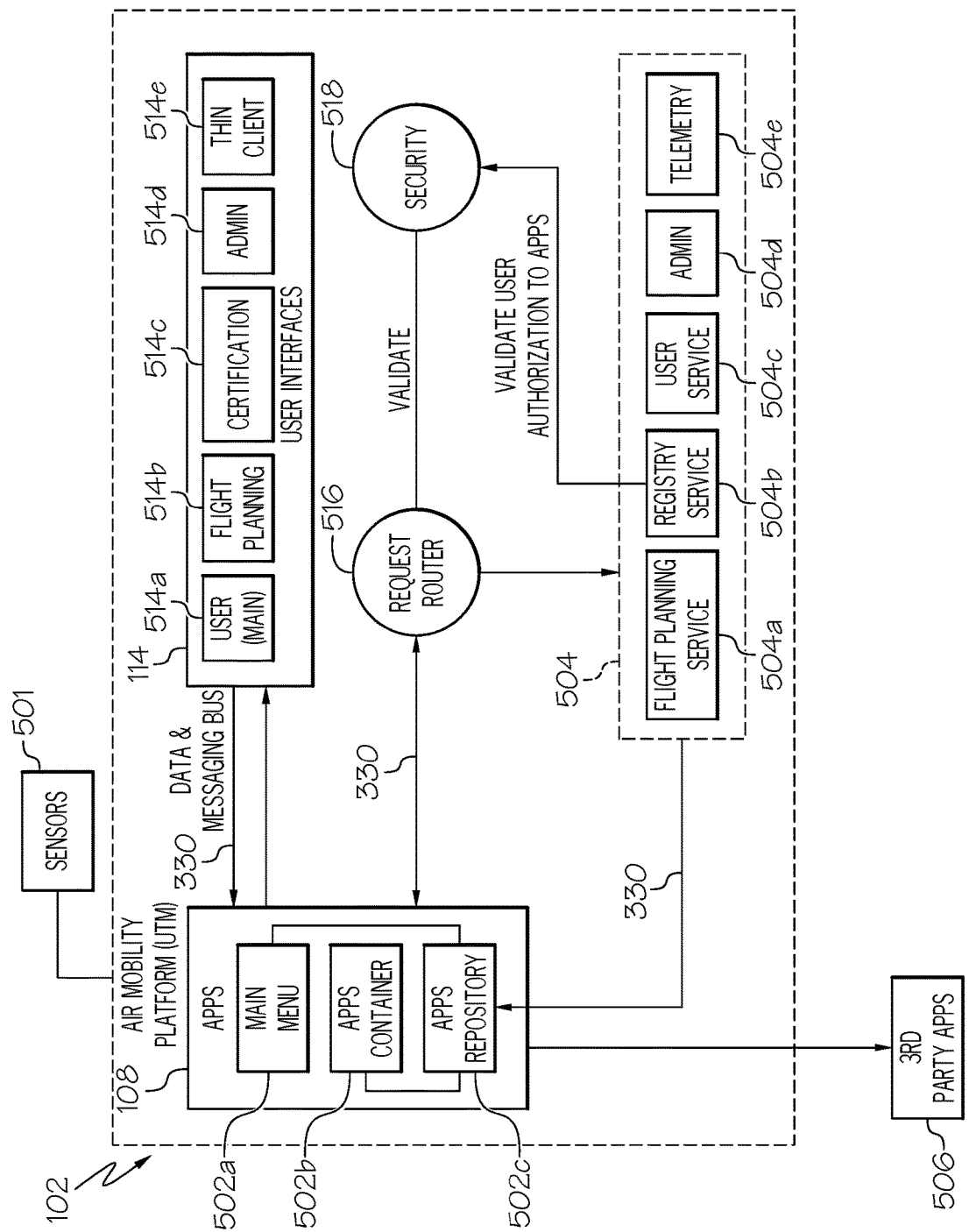
FIG. 5 depicts user interfaces provided by the air mobility platform, according to embodiments provided herein.

FIG. 5 depicts a depiction of user interfaces 114 provided by the air mobility platform 102, according to embodiments provided herein. As illustrated, the air mobility platform 102 may provide intermediate processing between certain data inputs, such as: at least one surveillance sensor, such as surveillance sensors 501; applications 108, which may be provided with a user main menu interface 514a, an flight planning interface 514b, and a certification interface 514c. The air mobility platform 102 may provide one or more of the user interfaces 114, such as the certification interface 514c. The air mobility platform 102 may include a flight planning service application 504a, a registry service application 504b, a user service application 504c, an administrator application 504d, and a telemetry application 504e.

The applications 108 may access third party applications 506. The applications 108 may also access the registry service application 504b via a request router 516a and a security module 518 that may secure data exchanges and validate user authorizations to access data or applications 108. The applications 108 may provide presentation of one or more user interfaces 514, such as a user main menu interface 514a, a flight planning interface 514b, a certification interface 514c, an administrator interface 514d, and a thin client interface 514e.

The user main menu interface 514a may provide access to the one or more of the applications 108 and/or third party applications 506. The air mobility platform 102 may further provide the user interfaces 114 over the multi-level bus 330, which may include levels such as caching and message bus 330a, wherefrom one or more data requests and request results may occur; and/or a persistent data bus 330b, and/or a search bus 330c.

In accordance with various embodiments, a user via a user computing device (e.g., user computing device 102a) may utilize one or more user interfaces 114 to form a mission specification and mission request for a particular flight. The air mobility platform 102 may include or identify takeoff and landing sites, particular specifications of an aerial vehicle 103, mission objectives, available trajectories, maneuver sequences/libraries, geographical waypoints, autopilot data needs, communication methodologies available for a particular aerial vehicle 103, and the like.

In an aspect, user interfaces 114 may include or otherwise have access to applications 108. As such, an user interface 114 may include a main menu 502a that may receive input from a user to perform desired functions, such as forming a mission specification. The air mobility platform 102 may provide an application container 502b (which may include software code and dependencies so the applications 108 be accessed on various computing environments), and an application repository 502c (which may store application containers 502b). In examples, applications 108 may be provided to user computing devices by providing application containers 502b to a user computing device over the multi-level bus 330. In some other examples, a user interface 114 may be given tunnel access to an application 108 running on a remote computing device. For instance, air mobility platform 102 may analyze the mission specification and may approve, modify, reject (e.g., fail), or otherwise process the mission specification via a remote computing device. The air mobility platform 102 may generate suggested solution trajectories for completion of a mission identified by the mission specification. Modifications may be presented for user, via the user interface 114, for approval or acceptance.

Figure 6:
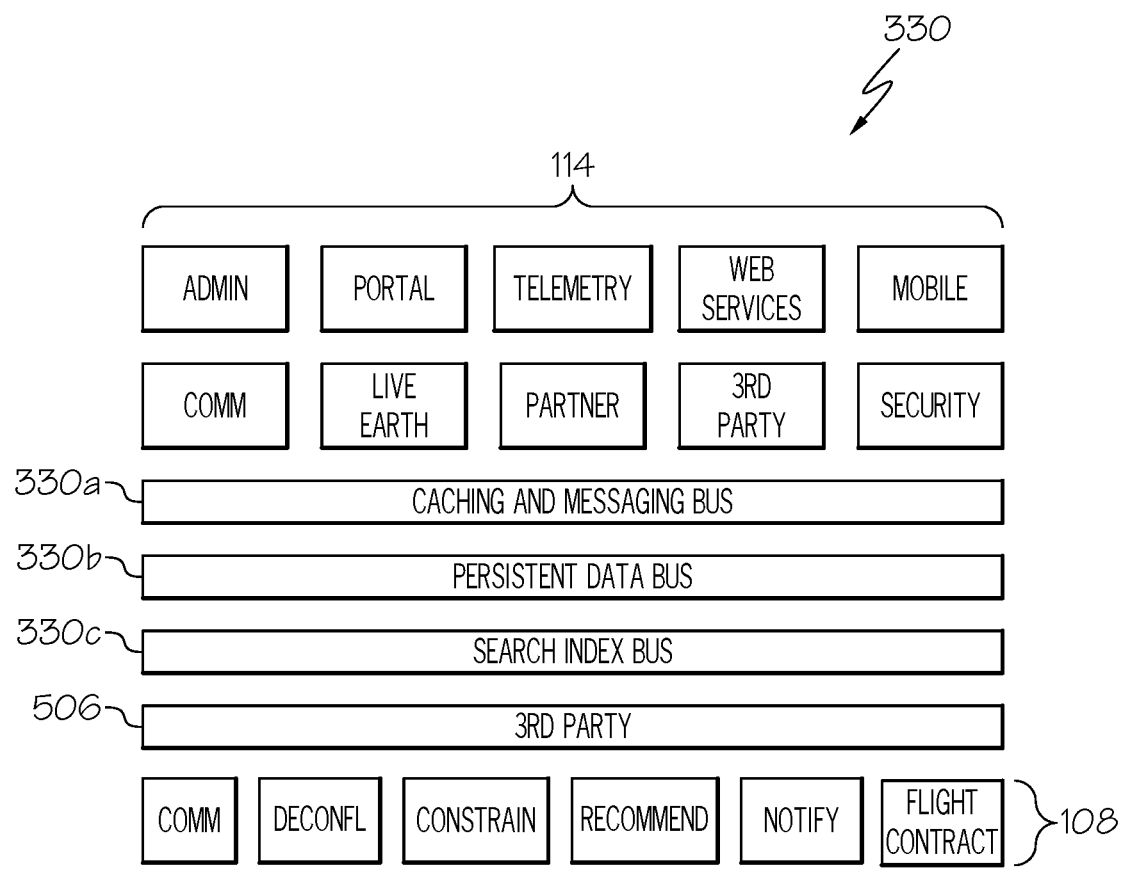
FIG. 6 depicts a multi-level bus for providing traffic management for an aerial vehicle according to embodiments provided herein.

FIG. 6 depicts a multi-level bus 330 for providing traffic management services for an aerial vehicle 103 according to embodiments provided herein. As illustrated, the multi-level bus 330 may be configured as a layered bus for handling different service levels of information, data and data requests, and/or for handling application communications of different applications operating at different layers. As illustrated, co-resident information and messaging may be exchanged over an in-memory grid bus level, such as the caching and message bus 330a, while external information may be exchanged over a database bus level, such as persistent data bus 330b to one or more captive, co-resident databases and/or to one or more system external third-party databases. A search data bus level, such as search bus 330c may provide for user search inquiries and/or may provide query response to internal queries from the applications 108 (FIG. 1) and/or the native applications 504 (FIG. 5) stemming from the providing of surveillance services. Also provided are the applications 108, as well as the third party applications 506, and the user interfaces 114. It should be understood that while FIG. 6 depicts three levels of the multi-level bus 330, this is merely an example, as some embodiments may have more or fewer levels.

The user interfaces 114 depicted in FIG. 6 include an administrative portal interface, which may hold administrative code for providing the user interface 114, which may include one or more APIs; a web services interface, a trajectory planning interface, etc. Similarly, the applications 108 may include a deconfliction application, which may insure proposed flight plans and trajectories do not conflict with terrain, other airspaces, other aerial vehicle, other flight plans, assets, structures, etc. The applications 108 may include a messaging application, which may serve environments of the air mobility platform 102 to exchange messages. The applications 108 may include a conformance monitoring application 108a, which may check for telemetry conformance with a flight plan contract and alert other systems and operators in the event of nonconformance. In some embodiments, the applications 108 may include a suggestion application, which may suggest alternative flight plans for those rejected by deconfliction. The applications 108 may include a USS gateway application, which may serve as a search and discovery gateway; a push messaging application, which may send push notifications to particular applications 108; a constraint management application, which may manage implications of modifications to current flight rules and restrictions, and/or other applications.

In some embodiments, the applications 108 may include a controlled airspace application, which may serve environments of the air mobility platform 102 to communicate regarding controlled airspaces. The applications 108 may include a partner services application, which may ingest third party data, such as regarding weather, airspace, flight restrictions, flight rules, etc. from trusted third party source. Similarly, the applications 108 may include one or more other applications used in the air mobility platform 102 and as may be apparent to the skilled artisan in light of the disclosure herein.

In accordance with the foregoing, and particularly with respect to the multi-level bus 330 of FIG. 6, a user may engage in data exchanges, messaging, processes, and analyses to form a mission specification and mission request for a particular aerial vehicle 103 for a particular flight. As such, the air mobility platform 102 may enable a performance model, which may include takeoff and landing sites, particular specifications of the aerial vehicle 103, as well as mission objectives. Also represented may be available trajectories, such as maneuver sequences/options, maneuvering capabilities, geographical waypoints, autopilot data needs, communication methodologies available for a particular aerial vehicle 103, etc.

The user may input to the user interface 114 a mission specification, which may be analyzed, and which may be approved, such as including suggested solution trajectories for the requested mission, or which may be failed, by the air mobility platform 102. If an approved trajectory plan is issued, the user may accept the plan or modify the plan through the user interface 114 and the solution trajectory (and/or flight plan) may be uploaded to traffic management aspects, such as unmanned air traffic management systems, ground control systems, etc., such as using the user interfaces 114. The solution trajectory may be uploaded to the aerial vehicle 103, over a network accessible via one of the levels of the multi-level bus 330, and the aerial vehicle 103 may then perform flight in accordance with the uploaded flight plan.

Figure 7:
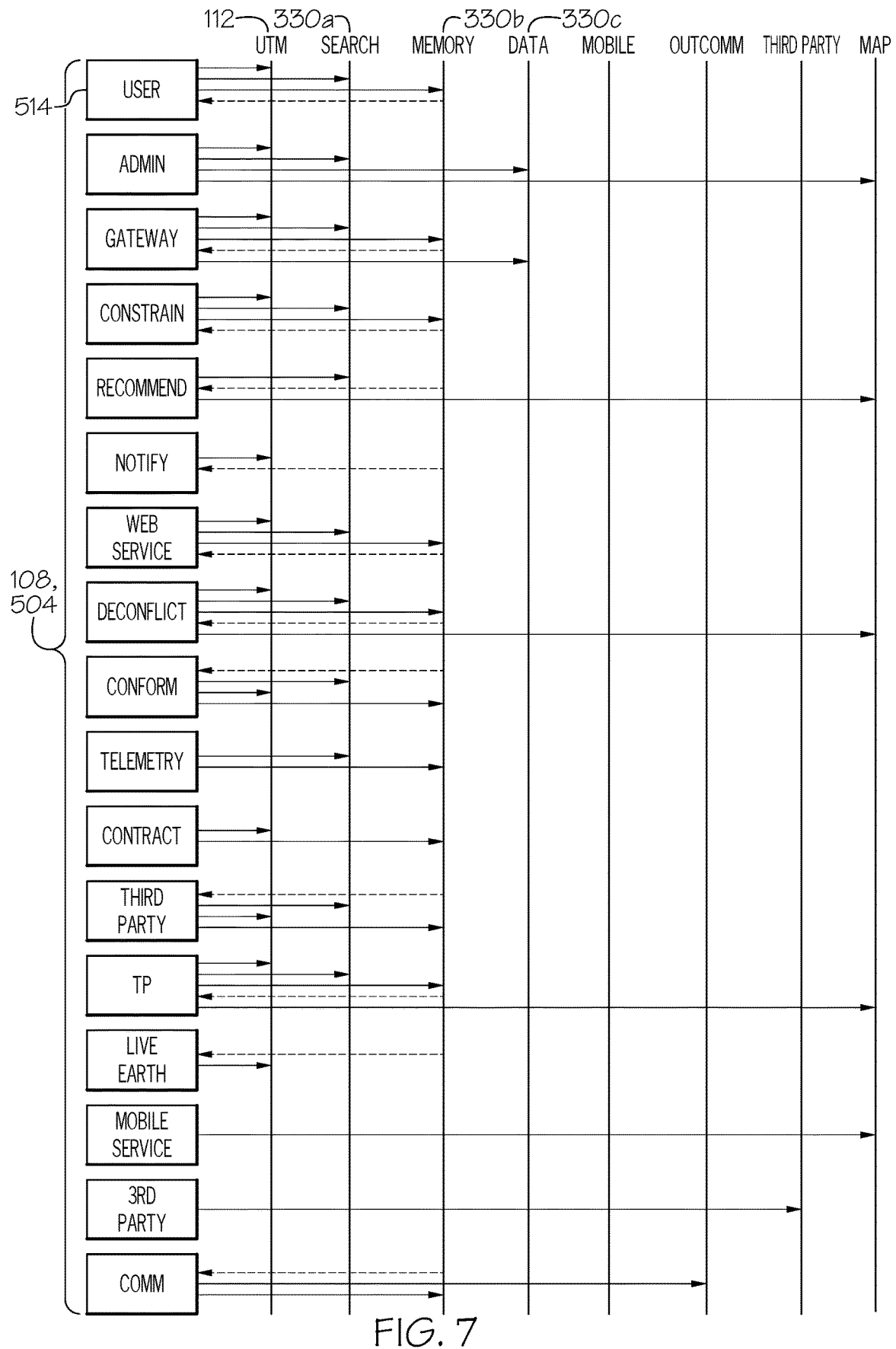
FIG. 7 depicts another example of a multi-level bus for providing traffic management for an aerial vehicle, according to embodiments provided herein.

FIG. 7 depicts another example of a multi-level bus 330 for traffic management services for an aerial vehicle 103, according to embodiments provided herein. As illustrated, the multi-level bus 330 may be configured to provide one or more of the user interfaces 114 (FIGS. 1, 5, 6) to users, where the user interfaces 114 may provide information exchanged over the bus levels heretofore unavailable autonomously regard to the aerial vehicle 103. The applications 108 and native applications 504 may be configured for providing other aspects of a request, both related directly to the request and as background aspects of the request. These services may be provided, both natively and non-natively, by the multi-level bus 330.

As illustrated in the example of FIG. 7, the user application may communicate data with one or more of the third party data sources 104, such as an aerial vehicle traffic management (UTM), the caching and message bus 330a, and receive data from the persistent data bus 330b. The admin application may send data to the third party data sources 104, the caching and message bus 330a, search bus 330c, and a map node. The gateway application may send data to the third party data sources 104, the caching and message bus 330a, and the persistent data bus 330b. The gateway application may receive data back form the persistent data bus 330b and send data to the search bus 330c. The constrain application may send data to the third party data sources 104, the search bus 330c, and the persistent data bus 330b and receive data back form the persistent data bus 330*b*. The recommend application may send data to the search bus 330*c*, receive data from the persistent data bus 330*b*, and send data to the map node. The notify application may send data to the third party data sources 104 and receive data from the persistent data bus 330*b*.

The web service application may send data to the third party data sources 104, the search bus 330*c*, and the persistent data bus 330*b* and receive data back form the persistent data bus 330*b*. The deconflict application may send data to the third party data sources 104, the search bus 330*c*, and the persistent data bus 330*b*. The deconfliction application 108*g* (FIG. 1) may receive data back from the persistent data bus 330*b* and send data to the map node.

The conform application may receive data from the persistent data bus 330*b*, send data to the search bus 330*c*, send data to the third party data sources 104, and send data to the persistent data bus 330*b*. The telemetry application 502*e* may send data to the search bus 330*c* and the persistent data bus 330*b*. The contract application may send data the search bus 330*c* and the persistent data bus 330*b*. The third party application may receive data from the persistent data bus 330*b* and send data to search bus 330*c*, the third party data sources 104, and the persistent data bus 330*b*. The TP application may send data to the third party data sources 104, the search bus 330*c*, and the persistent data bus 330*b*. The TP application may also receive data from the persistent data bus 330*b* and send data to the map node.

The live earth application may receive data from the persistent data bus 330*b* and send data to the third party data sources 104. The mobile service application may send data to a mobile node. The third party application may send data to the third party node. The communication application may receive data from the persistent data bus 330*b*, send data to the outward communication node, and send data to the persistent data bus 330*b*.

Figure 8:
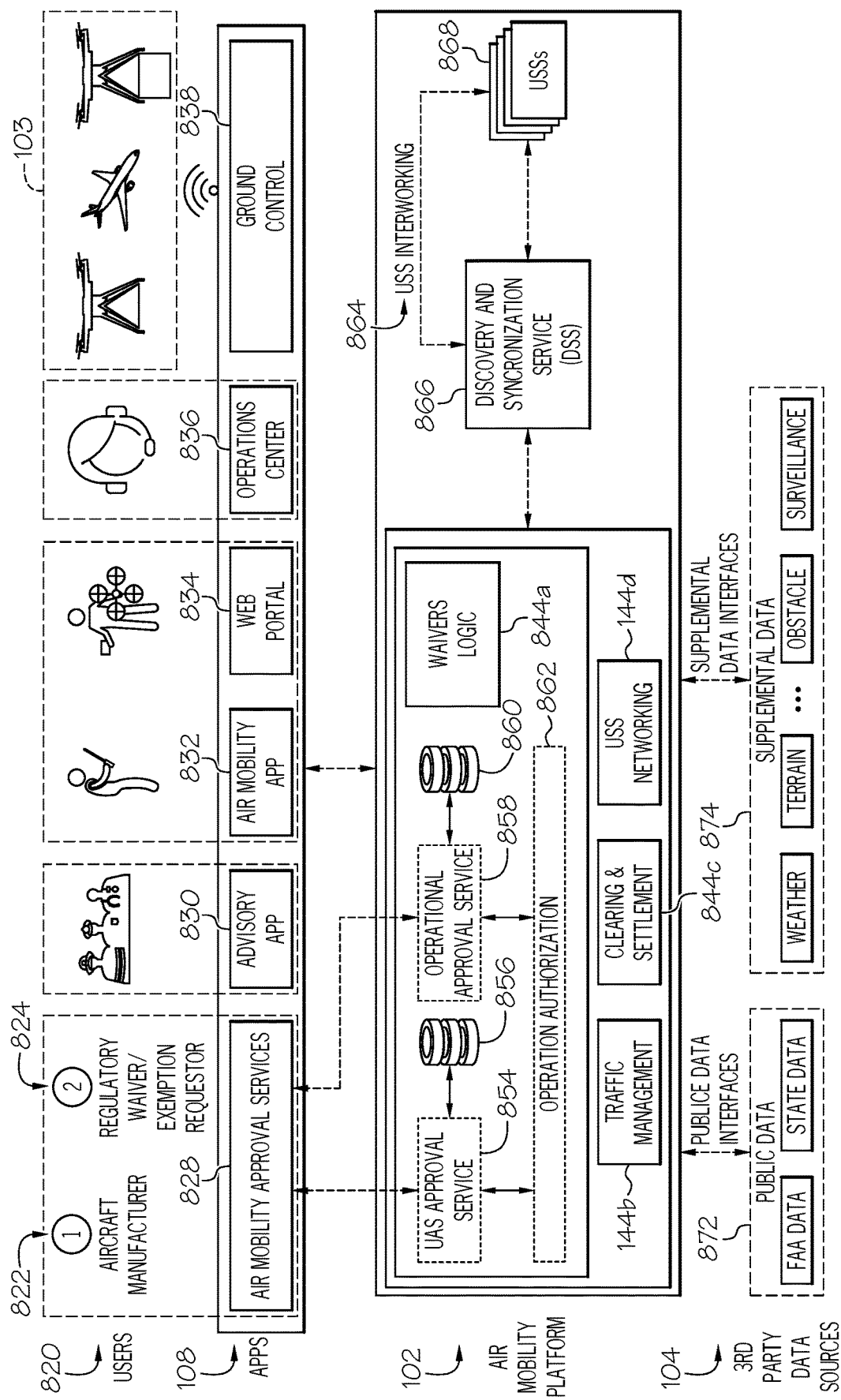
FIG. 8 depicts an architecture for providing an aircraft approval services platform, according to embodiments described herein.

FIG. 8 depicts a master services architecture 800 for providing services to aerial vehicles 103, according to embodiments described herein. It is noted that master services architecture 800 may include the same, similar, or different aspects as those described with reference to the master services architectures of FIGS. 1 and 4.

The master services architecture 800 may provide a plurality of autonomous services, engines and/or platforms that are communicative with third party data sources, where the third party data sources may be rules-based, non-rules based, informationally based, or the like. As illustrated, the users 820 of the air mobility platform 102 may include a drone manufacturer 822, a regulatory waiver/exception requestor 824, an advisor, and/or other user. The applications 108 may cause the air mobility platform 102 to utilize via the multi-level bus 330. It is noted that the applications 108 may comprise the same or different applications as described with reference to FIGS. 1 and 4. In an example, the master services architecture 800 may include an approval services application 828, an advisory application 830, an air mobility mobile application 832, a web portal 834, an operations center 836, and a ground control application 838. The drone manufacturer 822 and the regulatory waiver/exception requestor 824 may utilize the approval services application 828. Similarly, ground control application 838 may communicate with the aerial vehicle 103.

The air mobility platform 102 may also include the waivers logic 844*a*, the traffic management logic 844*b*, clearing logic 844*c*, and the interworking logic 844*d*. The waivers logic 844*a* may include a UAS approval service 106*b* (FIG. 1), waver kit configuration data 856, an operational approval service module 106*a* (FIG. 1), approved UAS models data 860, and an operational authorization module 862. The air mobility platform 102 may additionally include and/or communicate with a discovery and synchronization service 866 and/or one or more UAS service suppliers 868. Also provided is a USS interworking infrastructure 864 that facilitates communication between the USSs 868 and a discovery and synchronization service 866.

Figure 9:
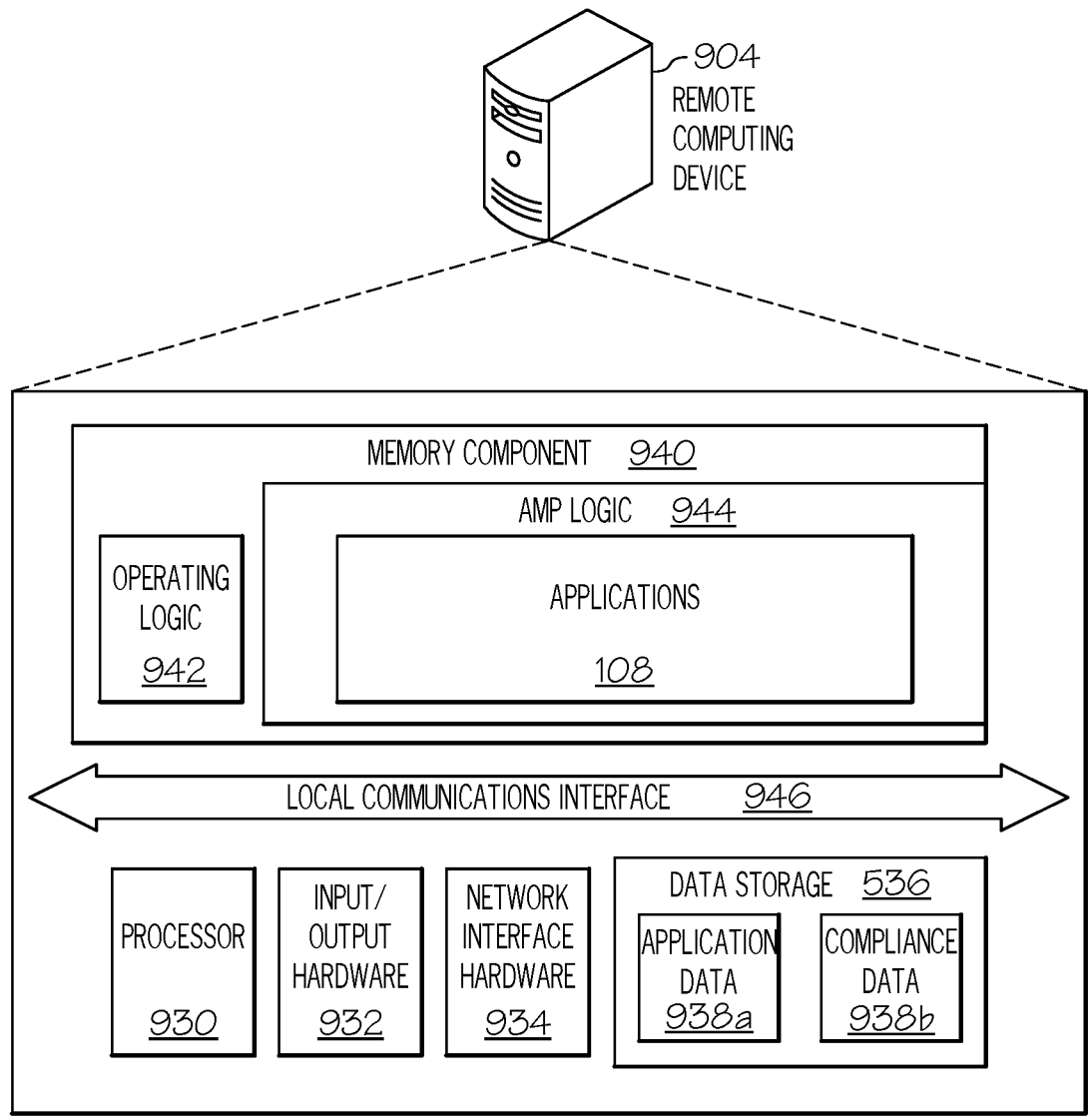
FIG. 9 depicts a remote computing device for providing an aircraft approval services platform, according to embodiments provided herein.

Additionally, the air mobility platform 102 may communicate with one or more third party data sources 104, which may be represented by a remote computing device (such as remote computing device 904 in FIG. 9). The third party data sources 104 may include public data 872, such as FAA data, state data, and/or other public data. The third party data sources 104 may include supplemental data 874, such as weather, terrain, obstacle, and surveillance.

As an example, some embodiments may provide a multilayer autonomous approval service for aircraft, equipment, and/or operational approvals, which may be provided for manned and/or unmanned aerial vehicle. Such approvals may draw on the third party data sources 104, including data models provided by regulatory bodies, such as the FAA, in relation to aircraft registration, operator registrations, relevant identity certifications of both aircraft and operators, flight plan submissions, capabilities verification, testing data, and so on. Additionally, some embodiments may draw on other third party data sources that are beyond typical approval rules, including but not limited to authoritative data provided by other rulemaking bodies, such as the FCC in relation to radiofrequency operation within FCC bandwidth guidelines, by way of non-limiting example.

In operation, embodiments may execute operations before and/or during flight, such as to plan, approve and modify airspace and submitted flight plans, monitor conformance with flight plans, monitor for confliction of flight plans, resolve conflicts in flight plans, manage airspace (such as may include exclusionary management for first responders/ no fly zones as they arise, and the like), and so on. These autonomous preflight and inflight monitoring may be communicated to the approval services and/or the approval services user interface.

The air mobility platform 102 may interact with any of a plurality of third party data sources 104, such as but not limited to at least one of the following: a regulatory third party, a governmental third party, a historical third party, and/or a weather-related third party. For example, aircraft and ground-based surveillance may be monitored and data obtained therefrom; obstacle detection sites may be accessed, such as may include terrain, geographical and structural assessment. Weather forecasting may be accessed for any area relevant to the request; aircraft use, capability, health, and performance data and history may be assessed; and current airspace activity by other aircraft, no fly zones, and the like may also be monitored.

The computing environment provided in FIG. 8 may also include communication sockets to one or more remote data sources, and may select relevant data that is unique to each approval request for use by the air mobility platform 102. Thereby, real-time autonomous approval services may be provided in the embodiments, even in the event of submission of a large number of approval requests in a variety of different geographies and air spaces substantially simultaneously, and/or where each necessitates assessment and manipulation of data unique to each such geography, airspace, operator, based on access by sockets from the air mobility platform 102 described herein to those unique third party data resources for each case of requested approval. The approval services referenced herein may include registration, which may include certification of manned and/or unmanned aerial vehicle for airworthiness, operation history, operator identifications, and the like. Also included is authorization for specific operations, locations, operators, etc., as well as pursuit of regulation compliance, waivers or exemptions for the aforementioned authorizations. Further included are authentications, which may persist not only during preflight but inflight for an approved flight application.

As another example, an application to the user interface may result in a vehicle certification. The aerial vehicle 103 may be approved as capable of engaging in the requested activity. Such approvals may be sought by, for example, aircraft manufacturers, pilots, users, and/or others. Also included in the requisite approvals returned to the user interface may be approvals of flight requests. Such approvals may include, for example, operator approvals and certifications, flight plan approvals, certifications, or modifications, etc. Thereafter, the disclosed systems, modules, platforms, and engines may confirm compliance, such as for an aircraft service provider, once a flight plan and operator are approved and the aerial vehicle 103 is in flight.

As another example, the higher risk the operation requested for approval is, the more analysis that may occur in the disclosed system in order to authorize the request. That is, a rigor versus risk analysis may be performed where the disclosed engine engages in greater rigor of analysis, such as may include drawing on additional third party information and/or engaging in more algorithmic applications, if the risk of the requested activity is deemed heightened.

Such risk may include a number of people that could be injured, in danger, or inconvenienced by certain activity. That is, if no persons stand a likelihood of injury by granting an approval, minimal analysis of the approval request may occur. At the other end of the spectrum, if a significant number of people may be exposed to harm or inconvenience by a request, Department of Defense-level security analysis may occur, detailed analyses of local government, operator and aircraft manufacturer insurance may occur, environmental analysis may be performed, and high-level safety and security analysis, checks, and monitoring may occur.

The master services architecture 800 manages communications via the multi-level bus 330. The multi-level bus 330 may allow computing devices, aerial vehicles 103, and applications 108 to communicate. In some embodiments, the air mobility platform 102 and the multi-level bus 330 may act as an arbitrating platform that provides oversight and bus level assignments, on behalf of the master services architecture 800. Further, the master services architecture 800 may include control, monitoring, security and switching capability for managing communications within the air mobility platform 102.

Moreover, the master services architecture 800 may provide users with different interfaces 114 through which the user may be provided tunnel access to the applications 108. Tunnel access may refer to use of a tunneling protocol for allowing movement of private network communications to be sent across a public network through encapsulation, for example. Tunnel access may employ some are all parts of a virtual local area tunnel, a pseudo wire tunnel, a generic routing encapsulation tunnel, or the like. For instance, tunneling may utilize a layered protocol model such as those of the OSI or TCP/IP protocol.

Further, the master services architecture 800 may be extensible such that applications 108 within the air mobility platform 102 may be added, removed, or otherwise modified. It is noted that applications 108 may require certification by an administrative user. As an example, a developer may develop and submit a developed application for approval within the air mobility platform 102. The developed application may be programmed to communicate with an application programming interface of the air mobility platform 102. An administrator may review the requested service and analyze the developed application. Based upon the review, the developed application may be approved and provided to others, such as via an application store, or may be denied approval. In at least some embodiments, a developer may be provided with suggested modifications to correct the developed application.

The master services architecture 800 may provide for streamlined access to data and applications, while providing security and cooperation between aerial vehicles 103. For instance, the master services architecture 800 may limit or control communications to third party data sources 104. Moreover, the master services architecture 800 may ensure that aerial vehicles 103 are utilizing the same data from third party data sources 104. As an example, the master services architecture 800 may ensure that aerial vehicle(s) 103 each use the same weather forecast, regulatory rules, or the like.

FIG. 9 depicts a remote computing device 904 that may be utilized for providing an aerial vehicle approval platform, according to embodiments provided herein. As illustrated, the remote computing device 904 may be configured to provide the air mobility platform 102 and thus includes a processor 930, input/output hardware 932, network interface hardware 934, a data storage component 936, which stores application data 938*a*, compliance data 938*b*, and/or other data, and the memory component 940. The application data 938*a* may include airspace data, an approved waiver kit, registered aerial vehicle data, and approved aerial vehicle's data as described with reference to FIG. 2 and/or other data. The compliance data 938*b* may include similar data that may be utilized to monitor compliance of the aerial vehicle 103, when in use. The memory component 940 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 904 and/or external to the remote computing device 904.

The memory component 940 may store operating system logic 942 and air mobility platform logic 944, which may include the applications 108 (FIG. 1). As illustrated, the air mobility platform logic 944 may include a plurality of different pieces of logic, each of which may be embodied as a computer program or module, firmware, and/or hardware, as an example. A local interface 946 is also included in FIG. 9 and may be implemented as a bus or other communication interface to facilitate communication among the components of the remote computing device 904.

The processor 930 may include any processing component operable to receive and execute instructions (such as from a data storage component 936 and/or the memory component 940). As described above, the input/output hardware 932 may include and/or be configured to interface with the components of FIG. 9.

The network interface hardware 934 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the remote computing device 904 and other computing devices, such as those depicted herein.

The operating system logic 942 may include an operating system and/or other software for managing components of the remote computing device 904. As discussed above, the air mobility platform logic 944 may reside in the memory component 940 and may be configured to cause the processor 930 to provide a platform for a user and/or administrator to submit an approval application, as described above. Similarly, the air mobility platform logic 944 may be utilized to monitor operation of the aerial vehicle 103 to ensure compliance with the regulations for which the user and/or the aerial vehicle 103 were approved, and/or provide other similar functionality.

It should be understood that while the components in FIG. 9 are illustrated as residing within the remote computing device 904, this is merely an example. In some embodiments, one or more of the components may reside external to the remote computing device 904. It should also be understood that, while the remote computing device 904 is illustrated as a single device, this is also merely an example. In some embodiments, the applications 108 may reside on different computing devices. As another example, one or more of the functionalities and/or components described herein may be provided by a remote computing device 904 and/or other computing devices described herein. These devices may also include hardware and/or software for performing the functionality described herein.

Additionally, while the embodiments described herein are described with the applications 108 each as separate logical components, this is also an example. In some embodiments, a single piece of logic (or multiple pieces of logic) may cause the desired computing device to provide the described functionality.

In at least one example, the air mobility platform logic 944 may allow for building of flight plans/mission requests by operators. A deconfliction node/application may insure proposed flight plans and trajectories do not conflict with terrain, other airspaces, other aerial vehicle, other flight plans, assets, structures, etc. A messaging node/application, may serve one or more environments of the air mobility platform to exchange messages. A conformance monitoring node/application, may be included and may check for telemetry conformance with a flight plan contract, and which may alert other systems and operators in the event of nonconformance. A suggestion/simulation node/application may be included, which may suggest alternative flight plans for those rejected by deconfliction. A USS gateway node/application may be included, which may serve as a search and discovery gateway. A push messaging node/application may be included, which may be enabled to send push notifications to particular applications. A constraint management node/application may be included, which may manage implications of modifications to current flight rules and restrictions. A controlled airspace node/application may be included, which may serve one or more environments of the air mobility platform to communicate regarding controlled airspaces. A partner services node/application may be provided, which may ingest third party data, such as regarding weather, airspace, flight restrictions, flight rules, and so on, from trusted third party sources. One or more nodes/applications may be utilized as part of the air mobility platform.

For instance, user computing device 111 may interact with air mobility platform logic 944 to receive information to form a mission specification and mission request for a particular aerial vehicle for a particular flight. The air mobility platform logic 944 may include or identify takeoff and landing sites, particular specifications of the aerial vehicle, as well as mission objectives. Also represented may be available trajectories, such as maneuver sequences/libraries, geographical waypoints, autopilot data needs, communication methodologies available for a particular aerial vehicle, and so on.

In some embodiments, the user may provide input to a user interface, such as a user main menu interface 514*a* or other user interface 514. The multi-level bus 330 of the air mobility platform logic 944 may process the input as described herein. The user may provide a mission specification identifying information specific to a planned or predicted planned flight of an aerial vehicle. The air mobility platform 102 may analyze the mission specification and may approve, modify, reject (e.g., fail), or otherwise process the mission specification. For example, the air mobility platform logic 944 may cause the remote computing device 904 to generate suggested solution trajectories for completion of a mission identified by the mission specification. Modifications may be presented for user approval or acceptance. In some embodiments, the remote computing device 904 may provide an approved trajectory plan.

If the air mobility platform logic 944 issues an approved trajectory plan, the user may accept the plan or modify the plan through the user interface 514. In another aspect, the air mobility platform logic 944 may upload or provide the approved trajectory (e.g., flight plan) to necessary traffic management systems, such as unmanned air traffic management systems, ground control systems, and the like, such as using aspects of user interface 514. The air mobility platform logic 944 may provide or upload the approved trajectory plan through direct communication or via a user device in communication with the aerial vehicle 103. In some embodiments, the communication may be provided over a network accessible via at least one level of the multi-level bus 330, and the aerial vehicle 103 may then perform flight maneuvers in accordance with the uploaded trajectory plan.

Figure 10:
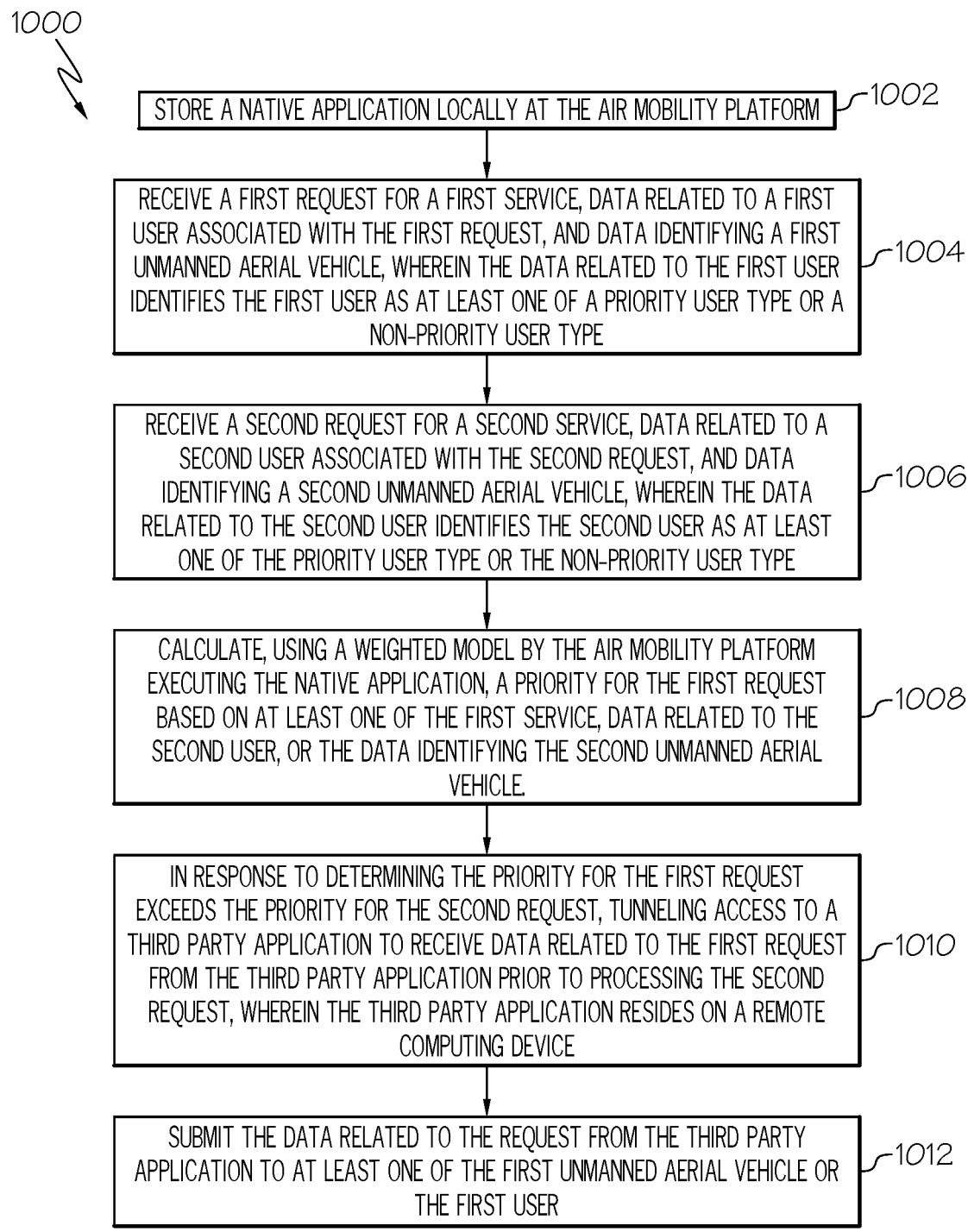
FIG. 10 depicts a flow diagram illustrating of master services architecture to process a requested service for an unmanned aerial vehicle, according to embodiments described herein.

FIG. 10 depicts a flow diagram illustrating of master services architecture to process a requested service for an unmanned aerial vehicle, according to embodiments described herein. In embodiments, architecture 100 (FIG. 1) may provide the air mobility platform 102 to perform the process 1000.

As illustrated in block 1002, process 1000 may store, by the air mobility platform 102, a native application locally to the air mobility platform 102. In block 1004, the process 100 may receive, by the air mobility platform 102 executing the native application, a first request for a first service, data related to a first user associated with the first request, and data identifying a first unmanned aerial vehicle, wherein the data related to the first user identifies the first user as at least one of a priority user type or a non-priority user type. In block 1006, the process 100 may receive, by the air mobility platform 102 executing the native application, a second request for a second service, data related to a second user associated with the second request, and data identifying a second unmanned aerial vehicle, wherein the data related to the second user identifies the second user as at least one of the priority user type or the non-priority user type.

In block 1008, the process 100 may calculate, by the air mobility platform 102 executing the native application, using a weighted model by the air mobility platform executing the native application, a priority for the first request based on at least one of the first service, data related to the second user, or the data identifying the second unmanned aerial vehicle. In block 1010, the process 100 may determine, by the air mobility platform 102 executing the native application, whether the priority for the first request exceeds a priority for the second request. In block 1012, the process 100 may, in response to determining the priority for the first request exceeds the priority for the second request, tunneling, by the air mobility platform executing the native application, access to a third party application to receive data related to the first request from the third party application prior to processing the second request, wherein the third party application resides on a remote computing device. In block 1014, the process 100 may submit, by the air mobility platform 102 executing the native application, the data related to the request from the third party application to at least one of the first unmanned aerial vehicle or the first user.

Further aspects of the invention are provided by the subject matter of the following clauses:

A computer-implemented system for providing a master services architecture for providing a requested service to an unmanned aerial vehicle, comprising: an air mobility platform comprising a computing device that includes a processor and a memory component that stores logic that, when executed by the processor, causes the air mobility platform to perform at least the following: store a native application locally at the air mobility platform; receive a first request for a first service, data related to a first user associated with the first request, and data identifying a first unmanned aerial vehicle, wherein the data related to the first user identifies the first user as at least one of a priority user type or a non-priority user type; receive a second request for a second service, data related to a second user associated with the second request, and data identifying a second unmanned aerial vehicle, wherein the data related to the second user identifies the second user as at least one of the priority user type or the non-priority user type; calculate, using a weighted model, a priority for the first request based on at least one of the first service, data related to the second user, or the data identifying the second unmanned aerial vehicle; determine whether the priority for the first request exceeds a priority for the second request; in response to determining the priority for the first request exceeds the priority for the second request, tunnel access to a third party application to receive data related to the first request from the third party application prior to processing the second request, wherein the third party application resides on a remote computing device; and submit the data related to the first request from the third party application to at least one of the first unmanned aerial vehicle or the first user.

The computer-implemented system of any of the preceding clauses, wherein the logic further causes the air mobility platform to perform at least the following: search a plurality of third party applications to identify that the data related to the request resides in the third party application.

The computer-implemented system of any of the preceding clauses, wherein the data related to the first unmanned aerial vehicle comprises at least one of an aerial vehicle identification, an aerial vehicle type, or an aerial vehicle capability.

The computer-implemented system of any of the preceding clauses, wherein the logic further causes the air mobility platform to perform at least the following: identify the first request as including data identifying an absolute priority, and calculate, using the weighted model, the priority for the first request as having the absolute priority.

The computer-implemented system of any of the preceding clauses, wherein the third party application comprises at least one of a terrain application, weather application, controlled airspaces application, airspace authorization application, or airspace restrictions application.

The computer-implemented system of any of the preceding clauses, wherein the first service comprise at least one of a control and storage of messaging service, storage service, system security service, diagnostics services, or command and control services.

The computer-implemented system of any of the preceding clauses, wherein the logic further causes the air mobility platform to: calculate, using the weighted model, the priority for the first request based on information received from at least one other third party application, and at least one of the first service, data related to the second user, or the data identifying the second unmanned aerial vehicle.

The computer-implemented system of any of the preceding clauses, wherein the logic further causes the air mobility platform to: archive an instances of the third party application locally at the air mobility platform, and access the instance of the third party application to respond to at least the second service.

The computer-implemented system of any of the preceding clauses, wherein the first request requests at least one of a trajectory mapping request, interrupt request, or a security monitoring request.

The computer-implemented system of any of the preceding clauses, wherein the first request includes an identification of a type associated with a user computing device issuing the first request, and wherein the logic further causes the air mobility platform to determine the type of the user computing device, and select an interface from a plurality of interfaces based at least in part on the determined type of the user computing device.

The computer-implemented system of any of the preceding clauses, wherein the non-priority user type includes at least one of a non-administrative user type or a commercial pilot type.

A method for processing a requested service for an unmanned aerial vehicle, comprising: storing, by an air mobility platform, a native application locally at the air mobility platform; receiving, by the air mobility platform executing the native application, a first request for a first service, data related to a first user associated with the first request, and data identifying a first unmanned aerial vehicle, wherein the data related to the first user identifies the first user as at least one of a priority user type or a non-priority user type; receiving, by the air mobility platform executing the native application, a second request for a second service, data related to a second user associated with the second request, and data identifying a second unmanned aerial vehicle, wherein the data related to the second user identifies the second user as at least one of the priority user type or the non-priority user type; calculating, using a weighted model by the air mobility platform executing the native application, a priority for the first request based on at least one of the first service, data related to the second user, or the data identifying the second unmanned aerial vehicle; determining, by the air mobility platform executing the native application, whether the priority for the first request exceeds a priority for the second request; in response to determining the priority for the first request exceeds the priority for the second request, tunneling, by the air mobility platform executing the native application, access to a third party application to receive data related to the first request from the third party application prior to processing the second request, wherein the third party application resides on a remote computing device; and submitting, by the air mobility platform executing the native application, the data related to the first request from the third party application to at least one of the first unmanned aerial vehicle or the first user.

The method of any of the preceding clauses, further comprising selecting, by the air mobility platform executing the native application, a priority user type interface from a plurality of user interfaces to transmit to the first user based on the data related to the first user identifying the first user as the priority user type; and transmitting, by the air mobility platform executing the native application, the priority user type interface to the first user.

The method of any of the preceding clauses, further comprising: selecting, by the air mobility platform executing the native application, a non-priority user type interface from a plurality of user interfaces to transmit to the first user based on the data related to the first user identifying the first user as the non-priority user type; and transmitting, by the air mobility platform executing the native application, the non-priority user type interface to the first user.

The method of any of the preceding clauses, wherein the priority user type comprises at least one of a first responder type or an administrator type.

The method of any of the preceding clauses, further comprising: obtaining, by the air mobility platform executing the native application, at least one approval model provided by an authoritative body from the third party application; and submitting the at least one approval model to the first user.

A non-transitory computer-readable medium that stores logic that, when executed by a computing device, causes the computing device to perform at least the following: store a native application locally; receive a first request for a first service, data related to a first user associated with the first request, and data identifying a first unmanned aerial vehicle, wherein the data related to the first user identifies the first user as at least one of a priority user type or a non-priority user type; receive a second request for a second service, data related to a second user associated with the second request, and data identifying a second unmanned aerial vehicle, wherein the data related to the second user identifies the second user as at least one of the priority user type or the non-priority user type; calculate, using a weighted model, a priority for the first request based on at least one of the first service, data related to the second user, or the data identifying the second unmanned aerial vehicle; determine whether the priority for the first request exceeds a priority for the second request; in response to determining the priority for the first request exceeds the priority for the second request, tunnel access to a third party application to receive data related to the first request from the third party application prior to processing the second request, wherein the third party application resides on a remote computing device; and submit the data related to the first request from the third party application to at least one of the first unmanned aerial vehicle or the first user.

The non-transitory computer-readable medium of any of the preceding clauses, wherein logic further causes the computing device to perform at least the following: calculate, using the weighted model, the priority for the first request based on information received from at least one other third party application, and at least one of the first service, data related to the second user, or the data identifying the second unmanned aerial vehicle.

The non-transitory computer-readable medium of any of the preceding clauses, wherein the third party application comprises an application associated with at least one of a regulatory body for approving unmanned aerial vehicle flight missions or a weather forecasting body.

The non-transitory computer-readable medium of any of the preceding clauses, wherein logic further causes the computing device to perform at least the following in response to determining the priority for the first request exceeds the priority for the second request, determine an alternate route for the second unmanned aerial vehicle.

The invention claimed is:

1. A computer-implemented system for providing a master services architecture for providing a requested service to an unmanned aerial vehicle, comprising:
    an air mobility platform comprising a computing device that includes a processor and a memory component that stores logic that, when executed by the processor, causes the air mobility platform to perform at least the following:
    store a native application locally at the air mobility platform;
    receive a first request for a first service, data related to a first user associated with the first request, and data identifying a first unmanned aerial vehicle, wherein the data related to the first user identifies the first user as a priority user type;
    receive a second request for a second service, data related to a second user associated with the second request, and data identifying a second unmanned aerial vehicle, wherein the data related to the second user identifies the second user as a non-priority user type;
    determine whether the second request relates to a failure condition of an aerial vehicle during flight;
    in response to determining that the second request does not relate to the failure condition of the aerial vehicle during flight, provide, to a first user computing device associated with the first request, tunnel access to a first third party application associated with the first service to receive data related to the first request from the first third party application via the tunnel access prior to processing the second request, wherein the first third party application resides on a remote computing device; and
    in response to determining that the second request relates to the failure condition of the aerial vehicle during flight, provide, to a second user computing device associated with the second request, tunnel access to a second third party application associated with the second service to receive data related to the second request from the second third party application via the tunnel access prior to processing the first request, wherein the second third party application resides on the remote computing device.

2. The computer-implemented system of claim 1, wherein the logic further causes the air mobility platform to perform at least the following:
    search a plurality of third party applications to identify that the data related to the first request resides in the first third party application.

3. The computer-implemented system of claim 2, wherein the data related to the first unmanned aerial vehicle comprises at least one of an aerial vehicle identification, an aerial vehicle type, or an aerial vehicle capability.

4. The computer-implemented system of claim 1, wherein the first third party application comprises at least one of a terrain application, weather application, controlled airspaces application, airspace authorization application, or airspace restrictions application.

5. The computer-implemented system of claim 1, wherein the first service comprises at least one of a control and storage of messaging service, storage service, system security service, diagnostics services, or command and control services.

6. The computer-implemented system of claim 1, wherein the logic further causes the air mobility platform to:
archive an instance of the second third party application locally at the air mobility platform, and
access the instance of the second third party application to respond to at least the second service.

7. The computer-implemented system of claim 1, wherein the first request requests at least one of a trajectory mapping request, interrupt request, or a security monitoring request.

8. The computer-implemented system of claim 1, wherein the first request includes an identification of a type associated with the first user computing device issuing the first request, and
wherein the logic further causes the air mobility platform to determine the type of the first user computing device, and select an interface from a plurality of interfaces based at least in part on the determined type of the first user computing device.

9. The computer-implemented system of claim 1, wherein the non-priority user type includes at least one of a non-administrative user type or a commercial pilot type.

10. A method for processing a requested service for an unmanned aerial vehicle, comprising:
storing, by an air mobility platform, a native application locally at the air mobility platform;
receiving, by the air mobility platform executing the native application, a first request for a first service, data related to a first user associated with the first request, and data identifying a first unmanned aerial vehicle, wherein the data related to the first user identifies the first user as a priority user type;
receiving, by the air mobility platform executing the native application, a second request for a second service, data related to a second user associated with the second request, and data identifying a second unmanned aerial vehicle, wherein the data related to the second user identifies the second user as a non-priority user type;
determining whether the second request relates to a failure condition of an aerial vehicle during flight;
in response to determining that the second request does not relate to the failure condition of the aerial vehicle during flight, providing, to a first user computing device associated with the first request by the air mobility platform executing the native application, tunnel access to a first third party application associated with the first service to receive data related to the first request from the first third party application via the tunnel access prior to processing the second request, wherein the first third party application resides on a remote computing device; and
in response to determining that the second request relates to the failure condition of the aerial vehicle during flight, providing, to a second user computing device associated with the second request, tunnel access to a second third party application associated with the second service to receive data related to the second request from the second third party application via the tunnel access prior to processing the first request, wherein the second third party application resides on the remote computing device.

11. The method of claim 10, further comprising:
selecting, by the air mobility platform executing the native application, a priority user type interface from a plurality of user interfaces to transmit to the first user based on the data related to the first user identifying the first user as the priority user type; and
transmitting, by the air mobility platform executing the native application, the priority user type interface to the first user.

12. The method of claim 10, further comprising:
selecting, by the air mobility platform executing the native application, a non-priority user type interface from a plurality of user interfaces to transmit to the first-second user based on the data related to the second user identifying the second user as the non-priority user type; and
transmitting, by the air mobility platform executing the native application, the non-priority user type interface to the second user.

13. The method of claim 10, wherein the priority user type comprises at least one of a first responder type or an administrator type.

14. The method of claim 10, further comprising:
obtaining, by the air mobility platform executing the native application, at least one approval model provided by an authoritative body from the first third party application; and
submitting the at least one approval model to the first user.

15. A non-transitory computer-readable medium that stores logic that, when executed by a computing device, causes the computing device to perform at least the following:
store a native application locally;
receive a first request for a first service, data related to a first user associated with the first request, and data identifying a first unmanned aerial vehicle, wherein the data related to the first user identifies the first user as a priority user type;
receive a second request for a second service, data related to a second user associated with the second request, and data identifying a second unmanned aerial vehicle, wherein the data related to the second user identifies the second user as a non-priority user type;
determine whether the second request relates to a failure condition of an aerial vehicle during flight;
in response to determining that the second request does not relate to the failure condition of the aerial vehicle during flight, provide, to a first user computing device associated with the first request, tunnel access to a third party application associated with the first service to receive data related to the first request from the third party application via the tunnel access prior to processing the second request, wherein the third party application resides on a remote computing device; and
in response to determining that the second request relates to the failure condition of the aerial vehicle during flight, provide, to a second user computing device associated with the second request, tunnel access to a third party application associated with the second service to receive data related to the second request from the third party application via the tunnel access prior to processing the first request, wherein the third party application resides on the remote computing device.

16. The non-transitory computer-readable medium of claim 15, wherein the first third party application comprises an application associated with at least one of a regulatory body for approving unmanned aerial vehicle flight missions or a weather forecasting body.

* * * * *